United States Patent [19]

Rogalski et al.

[11] Patent Number: 5,087,060
[45] Date of Patent: Feb. 11, 1992

[54] ROW N SLED

[76] Inventors: Joseph Rogalski, 29 Congress St. Apt. 5, Nashua, N.H. 03062; George Spector, 233 Broadway Rm. 3815, New York, N.Y. 10007

[21] Appl. No.: 642,058

[22] Filed: Jan. 16, 1991

[51] Int. Cl.⁵ .............................................. B62B 13/06
[52] U.S. Cl. .................................. 280/12.11; 280/14.1
[58] Field of Search ............... 280/12.1, 12.11, 12.12, 280/14.1, 15; 114/13, 21, 22

[56] References Cited

U.S. PATENT DOCUMENTS

| | | | |
|---|---|---|---|
| 172,185 | 1/1876 | Shelton, Jr. | 280/12.11 |
| 198,063 | 12/1877 | Williams | 280/12.11 |
| 224,432 | 2/1880 | Hitchiner et al. | 280/12.11 |
| 374,428 | 12/1887 | Robbin | 280/12.11 |
| 1,355,520 | 10/1920 | Albrecht | 280/12.11 |
| 1,408,029 | 2/1922 | Platte | 280/12.11 |
| 1,592,555 | 7/1926 | Cafmeyer | 280/12.11 |
| 1,783,833 | 12/1930 | Elsner | 280/604 |
| 2,487,663 | 11/1949 | Mikulic | 280/12.11 X |
| 3,858,894 | 1/1975 | Ver et al. | 280/604 |

*Primary Examiner*—Andres Kashnikow
*Assistant Examiner*—Michael Mar

[57] ABSTRACT

A snow rowing sled is provided and consists of a frame affixed between and elevated above a pair of parallel spaced apart skis. Drive mechanisms will propel the sled forward by a person sitting on a seat on the frame by manually operating thrust levers which engage the snow.

3 Claims, 1 Drawing Sheet

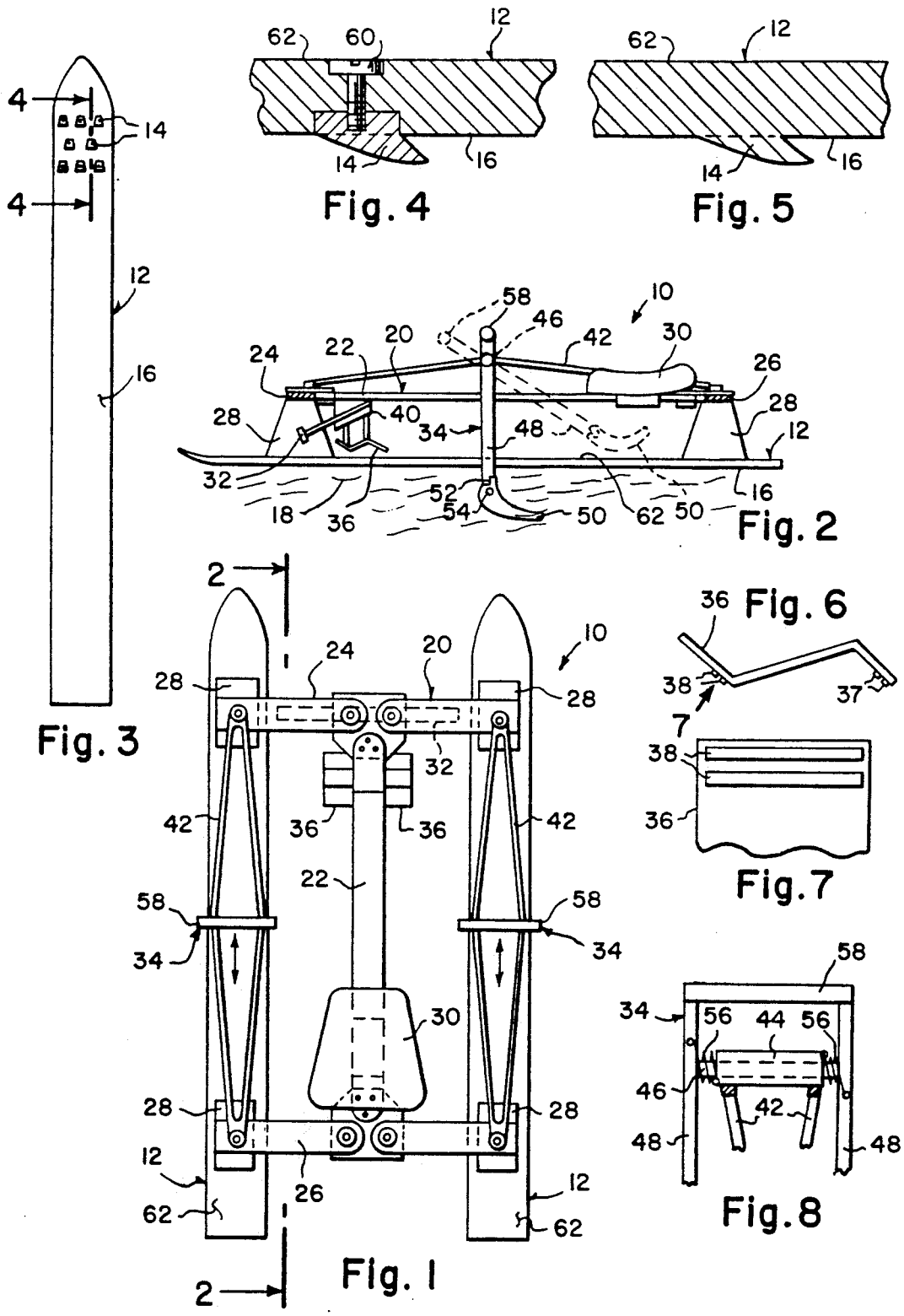

ROW N SLED

BACKGROUND OF THE INVENTION

The instant invention relates generally to sleds and more specifically it relates to a snow rowing sled which provides combining the best features of a snow sled and a rowing machine.

There are available various conventional sleds which do not provide the novel improvements of the invention herein disclosed.

SUMMARY OF THE INVENTION

A primary object of the present invention is to provide a snow rowing sled that will overcome the shortcomings of the prior art devices.

Another object is to provide a snow rowing sled that includes drive mechanism to propel the sled forward by a person sitting on the sled manually operating thrust levers which engage the snow.

An additional object is to provide a snow rowing sled in which the person sitting on the sled manually operating the thrust levers will obtain a healthful exercise when causing the sled to move forward.

A further object is to provide a snow rowing sled that is simple and easy to use.

A still further object is to provide a snow rowing sled that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top plan view of the invention.

FIG. 2 is a cross sectional view taken along line 2—2 in FIG. 1.

FIG. 3 is a bottom view of one of the skies showing the blade-type cleats thereon.

FIG. 4 is a cross sectional view taken along line 4—4 in FIG. 3, with the ski rotated 180 degrees showing an attachable cleat therein.

FIG. 5 is a cross sectional view similar to FIG. 4, showing a cleat built into the ski.

FIG. 6 is an enlarged side view of one of the foot brake pedals.

FIG. 7 is a bottom view of the foot brake pedal taken in direction of arrow 7 in FIG. 6, showing the tread to grip the snow.

FIG. 8 is an end view of the mechanism for driving the sled forward when the handles are pushed by the operator.

DETAILED DESCRIPTION OF THE PREFERRED EMBODIMENTS

Turning now descriptively to the drawings, in which similar reference characters denote similar elements throughout the several view, the Figures illustrate a snow rowing sled 10 consisting of a pair of parallel spaced apart skis 12 with a plurality of blade-type cleats 14 rearwardly facing along the bottom surface 16 of each of the skis 12, which will dig into snow 18 during a rearward movement of the skis 12. An H-shaped frame 20 having a long center member 22 and a pair of short end members 24 and 26 is affixed between and elevated above the skis 12 by standards 28. A seat 30 is mounted rearwardly on the long center member 22 of the frame 20 so that a person being the operator of the sled 10 can sit thereupon. A foot rest 32 is mounted forwardly below the front short end member 24 on the frame 20 to support the feet of the operator. A pair of drive mechanisms 34 are provided in which each is mounted over one of the skis 12 between the short end members 24 and 26 of the frame 20. The drive mechanism 34 will drive the sled 10 forward when manually operated by the operator.

Oval foot brake pedals 36, having treads 38 are mounted to the underside of the frame 20 at 40 near the foot rest 32 so that when the foot brake pedals 36 are depressed by the feet of the operator the treads 38 of the foot brake pedals 36 will contact the snow 18 to stop the forward movement of the sled 10.

Each drive mechanism 34 includes an elongated brace member 42 mounted to and extending between the short end members 24 and 26 of the frame 20. A sleeve 44 is affixed onto the center of the brake member 2, while a pivot rod 46 extends through the sleeve 44. A thrust lever 48 is affixed to each end of the pivot rod 46 so that the two thrust levers 48 can extend down on each side of the ski 12. A hook spur 50 having a stop member 52 is pivotly mounted at 54 to the lower end of each thrust lever 48 to face rearwardly. A pair of return springs 56 are carried on the pivot rod 46. Each spring has one end affixed to the sleeve 44 and other end affixed to one thrust lever 48, to normally keep the thrust levers 48 in a vertical position. A handle 58 is affixed to and extends between the upper ends of the thrust levers 48 so that the operator can grip the handle 58 and push forward whereby the stop members 52 will engage with the lower ends of the thrust levers 48 allowing the hook spurs 50 to dig into the snow 18 and drive the sled 10 forward. When the handle 58 is pulled rearwardly the stop members 52 will disengage with the lower ends of the thrust levers 48 allowing the hook spurs 50 to pivot back so that the thrust levers 48 can go back to a vertical position.

A shown in FIG. 5, each cleat 14 can be built into the bottom surface 16 of the ski. As shown in FIG. 4, each cleat 14 is attachable into the bottom surface 16 of the ski 12 by a countersunk bolt 60 extending through the top surface 62 of the ski 12 and into the cleat 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A snow rowing sled comprising:
   a) a pair of parallel spaced apart skis;
   b) a plurality of blade-type cleats rearwardly facing along the bottom surface of each of said skis, which will dig into snow during a rearward movement of said skis;
   c) an H-shaped frame having a long center member and front and rear short end members affixed between and elevated above said skis;

d) a seat mounted rearwardly on said long center member of said frame so that a person being the operator of said sled can sit thereupon;

e) a foot rest mounted forwardly below said front short end member on said frame to support the feet of the operator; and f) a pair of drive mechanisms, each drive mechanism includes a pair of thrust levers mounted to a pivot rod having a fixed pivot axis for pivotal movement relative to the skis, each pair of thrust levers straddling a respective one of said pair of skis between said short end members and having upper and lower ends, a handle affixed to and extending between the upper ends of each pair of thrust levers, and a pair of hook spurs pivotally mounted to respective lower ends of each pair of thrust levers, each hook spur being mounted to face rearwardly and having a stop member for preventing pivotal movement of said hook spur relative to said thrust lever when said handles are pushed forwardly by the operator for propelling the sled in a forward direction.

2. A snow rowing sled as recited in claim 1, further comprising dual foot brake pedals having treads mounted to the underside of said frame near said foot rest so that when said foot brake pedals are depressed by the feet of the operator said treads of said foot brake pedals will contact the snow to stop the forward movement of said sled.

3. A snow rowing sled as recited in claim 2, wherein each said drive mechanism further includes:

a) an elongated brace member affixed to and extending upwardly between said short end members to a central point above said frame and above a respective one of said skis;

b) a sleeve transversely affixed to said brace member at said central point, said pivot rod extending through said sleeve; and c) a pair of return springs carried on each said pivot rod each spring having one end affixed to said sleeve and another end affixed to a respective one of said thrust levers for biasing said thrust levers in a vertical position, each pair of thrust levers being symmetrically affixed to the ends of the pivot rod and extends along the sides of a respective brace and ski for pivotal movement relative thereto, wherein the operator can grip said handle and push forward whereby the stop members will engage with the lower ends of the thrust levers allowing said hook spurs to dig into the snow and drive said sled forward; and said spring will bias said levers back to a vertical position with the pivotal mounting of said hook spurs allowing such return motion to the vertical position.

* * * * *